(12) United States Patent
Saitou

(10) Patent No.: US 12,430,499 B2
(45) Date of Patent: Sep. 30, 2025

(54) INFORMATION PROCESSING APPARATUS, NON-TRANSITORY COMPUTER READABLE MEDIUM, AND INFORMATION PROCESSING METHOD FOR PREVENTING AN UNINTENTIONAL HIDING OF A DOCUMENT IMAGE DURING A USER OPERATION

(71) Applicant: FUJIFILM Business Innovation Corp., Tokyo (JP)

(72) Inventor: Yasushi Saitou, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 330 days.

(21) Appl. No.: 17/858,385

(22) Filed: Jul. 6, 2022

(65) Prior Publication Data
US 2023/0073780 A1    Mar. 9, 2023

(30) Foreign Application Priority Data

Sep. 9, 2021 (JP) ................................. 2021-146622

(51) Int. Cl.
G06F 40/169 (2020.01)
G06F 3/04812 (2022.01)
G06F 3/04817 (2022.01)

(52) U.S. Cl.
CPC ........ *G06F 40/169* (2020.01); *G06F 3/04812* (2013.01); *G06F 3/04817* (2013.01)

(58) Field of Classification Search
None
See application file for complete search history.

(56) References Cited

U.S. PATENT DOCUMENTS 6,160,554 A   12/2000  Krause
8,392,151 B1   3/2013  Grace et al.
(Continued)

FOREIGN PATENT DOCUMENTS

JP   2008-042359 A   2/2008
JP   2017-117233 A   6/2017
JP   2020-017314 A   1/2020

OTHER PUBLICATIONS

Feb. 10, 2023 Extended European Search Report Issued in European Patent Application No. 22188689.8.

*Primary Examiner* — Gabriel Mercado
(74) *Attorney, Agent, or Firm* — Oliff PLC

(57) ABSTRACT

An information processing apparatus includes a processor configured to: on an operation screen that accepts a user operation, display a document image corresponding to contents of a document in response to an operation of giving an instruction to display the document image; hide the document image in a case where an operation of removing specified coordinates specified by the user operation from a predetermined area including an area where the document image is displayed is performed; in a case where an instruction to perform a process involving determination of a position on the operation screen is given by the user for the document image, shift to a standby state waiting for determination of the position; and not hide the document image in the standby state even if an operation of removing the specified coordinates from the predetermined area is performed.

20 Claims, 13 Drawing Sheets

(56) References Cited

U.S. PATENT DOCUMENTS

| | | | |
|---|---|---|---|
| 2006/0161864 A1* | 7/2006 | Windl | G06F 3/0482 |
| | | | 715/810 |
| 2011/0320984 A1* | 12/2011 | Irani | G06F 3/0482 |
| | | | 715/841 |
| 2013/0212534 A1* | 8/2013 | Knight | G06F 3/0482 |
| | | | 715/838 |
| 2014/0240255 A1 | 8/2014 | Kim et al. | |
| 2016/0117289 A1* | 4/2016 | Pan | G06F 40/169 |
| | | | 715/230 |
| 2017/0060829 A1* | 3/2017 | Bhatt | G06F 40/169 |
| 2018/0165255 A1* | 6/2018 | Gafford | G09B 5/06 |

* cited by examiner

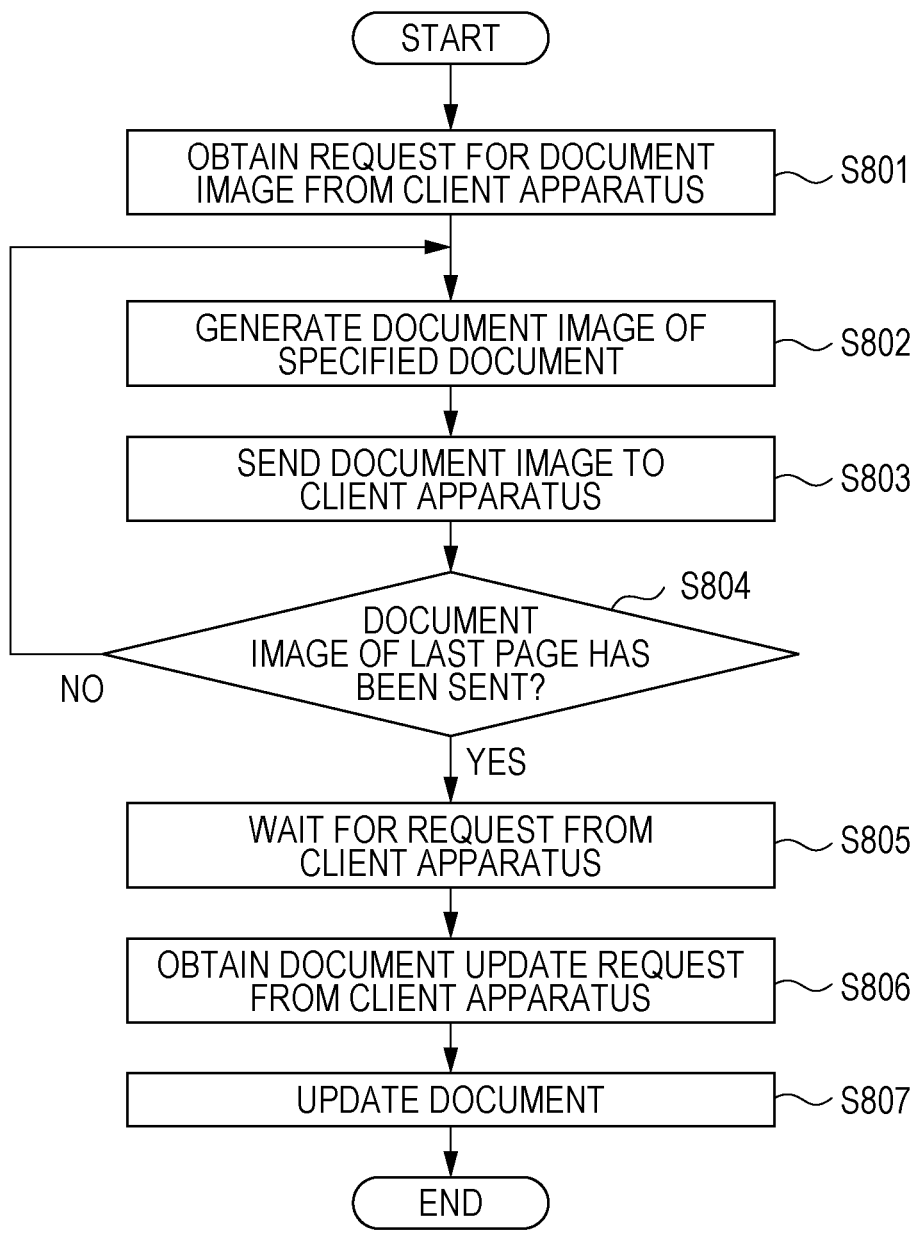

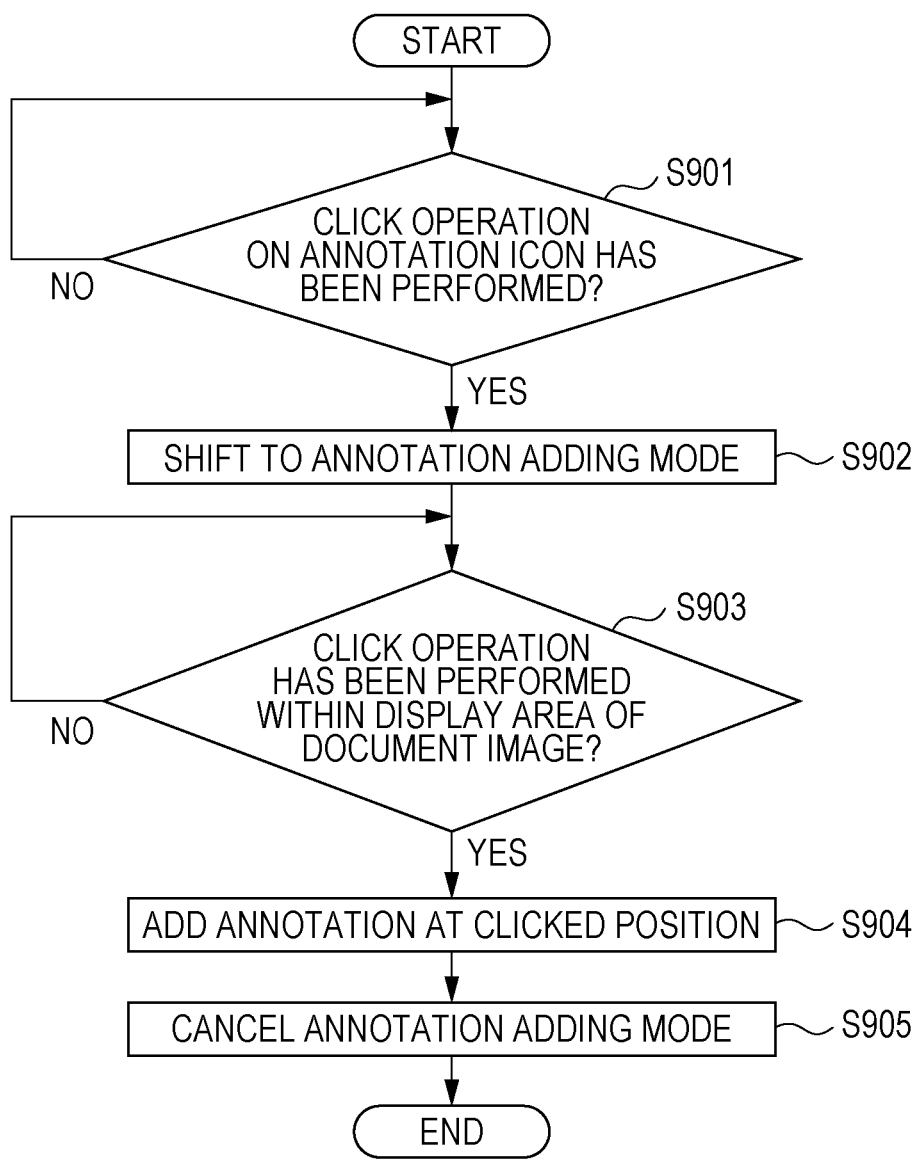

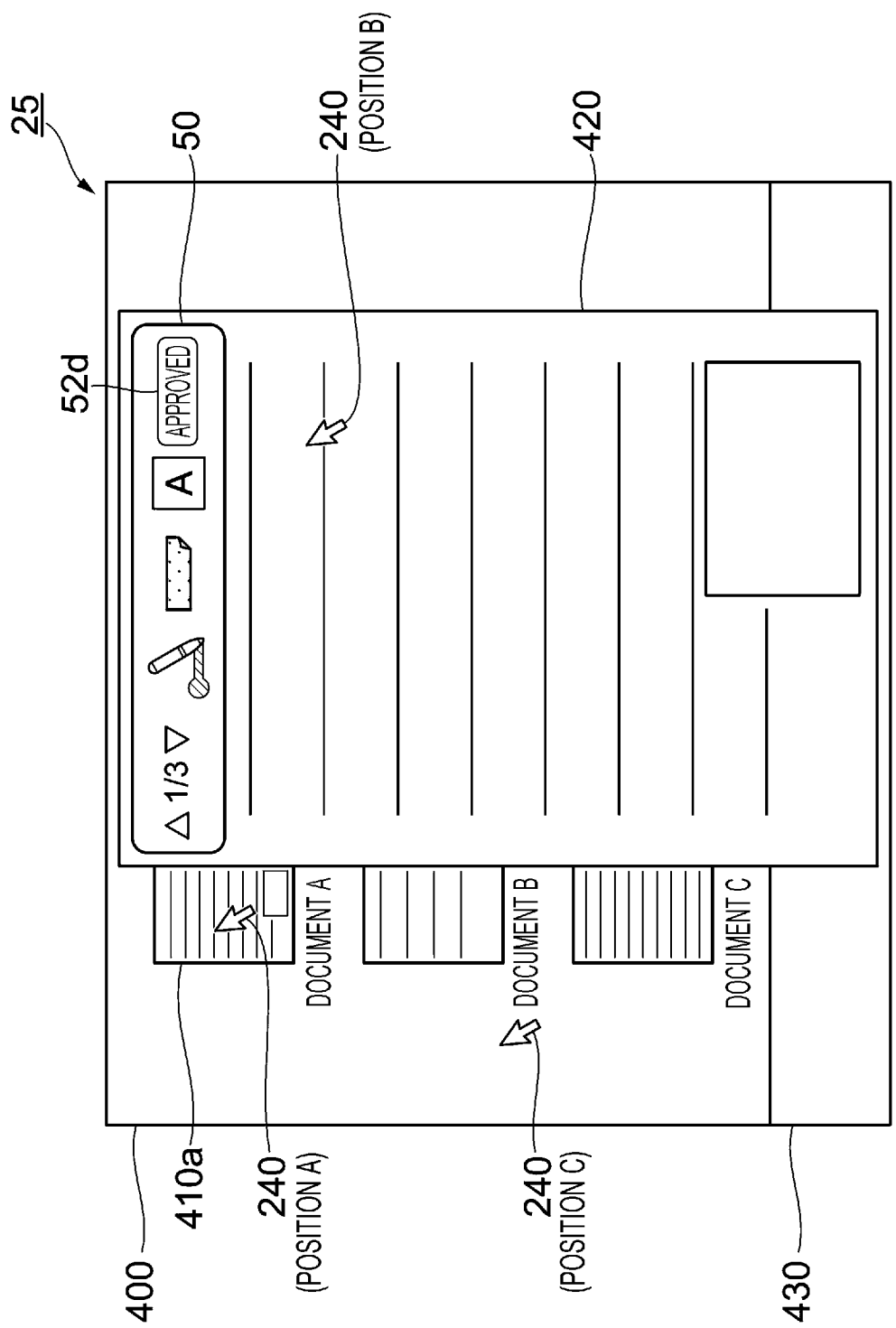

INFORMATION PROCESSING APPARATUS, NON-TRANSITORY COMPUTER READABLE MEDIUM, AND INFORMATION PROCESSING METHOD FOR PREVENTING AN UNINTENTIONAL HIDING OF A DOCUMENT IMAGE DURING A USER OPERATION

CROSS-REFERENCE TO RELATED APPLICATIONS

This application is based on and claims priority under 35 USC 119 from Japanese Patent Application No. 2021-146622 filed Sep. 9, 2021.

BACKGROUND

(i) Technical Field

The present disclosure relates to an information processing apparatus, a non-transitory computer readable medium, and an information processing method.

(ii) Related Art

Japanese Unexamined Patent Application Publication No. 2017-117233 describes an information processing apparatus as technology for assisting, using an image, an input of instruction contents (input contents) related to an image. The information processing apparatus is capable of performing the following: displaying a list of images serving as editing examples; in response to selection of an image by a user, automatically performing annotation setting in accordance with annotation information associated with the selected image; and inputting instruction contents using an annotation according to the editing example.

Japanese Unexamined Patent Application Publication No. 2008-42359 describes, as technology for making it easier for the creator of a document to convey information the creator wants to convey to a viewer when displaying a thumbnail image of document data, a configuration that adds a thumbnail control object to the document data. For example, the configuration expands partial information, such as a stamp or a sticky note annotation, without enlarging the thumbnail image of the entire document.

There has been available an information processing apparatus equipped with the function of displaying, in response to an operation of specifying a document when managing documents displayed as a list using thumbnail images, text, etc., a document image corresponding to the contents of the specified document.

Such an information processing apparatus has, for example, the mode of maintaining displaying a document image while a corresponding document displayed in a list remains specified by a mouse-over on the document, and hiding the document image when the mouse-over is canceled. In this mode, it is possible to switch between displaying and hiding a document image with a simple operation. However, for example, to perform a process involving determination of a position on an operation screen, as in the case of pasting an annotation at a desired position in a document image, the specification may be unintentionally canceled to hide the document image, which may deteriorate user operability.

SUMMARY

Aspects of non-limiting embodiments of the present disclosure relate to suppressing deterioration of user operability due to the fact that a document image is unintentionally hidden, as compared with the case where a document image is hidden by canceling the specification even when performing a process involving determination of a position.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus comprising: a processor configured to: on an operation screen that accepts a user operation, display a document image corresponding to contents of a document in response to an operation of giving an instruction to display the document image; hide the document image in a case where an operation of removing specified coordinates specified by the user operation from a predetermined area including an area where the document image is displayed is performed; in a case where an instruction to perform a process involving determination of a position on the operation screen is given by the user for the document image, shift to a standby state waiting for determination of the position; and not hide the document image in the standby state even if an operation of removing the specified coordinates from the predetermined area is performed.

BRIEF DESCRIPTION OF THE DRAWINGS

An exemplary embodiment of the present disclosure will be described in detail based on the following figures, wherein:

FIG. 8 is a flowchart illustrating an example of a procedure performed by the server apparatus;

FIG. 9 is a flowchart illustrating an example of a procedure, performed by the client apparatus, related to the addition of an annotation to a document image;

FIGS. 10A and 10B are diagrams illustrating display examples of the operation screen when using a document processing service; that is, FIG. 10A illustrates a display example of a state where a document image is displayed, and FIG. 10B illustrates a display example of a state where the mode has now shifted to an annotation adding mode;

DETAILED DESCRIPTION

Hereinafter, an exemplary embodiment of the present disclosure will be described with reference to the accompanying drawings.

System Configuration of Information Processing System 1

Figure 1:
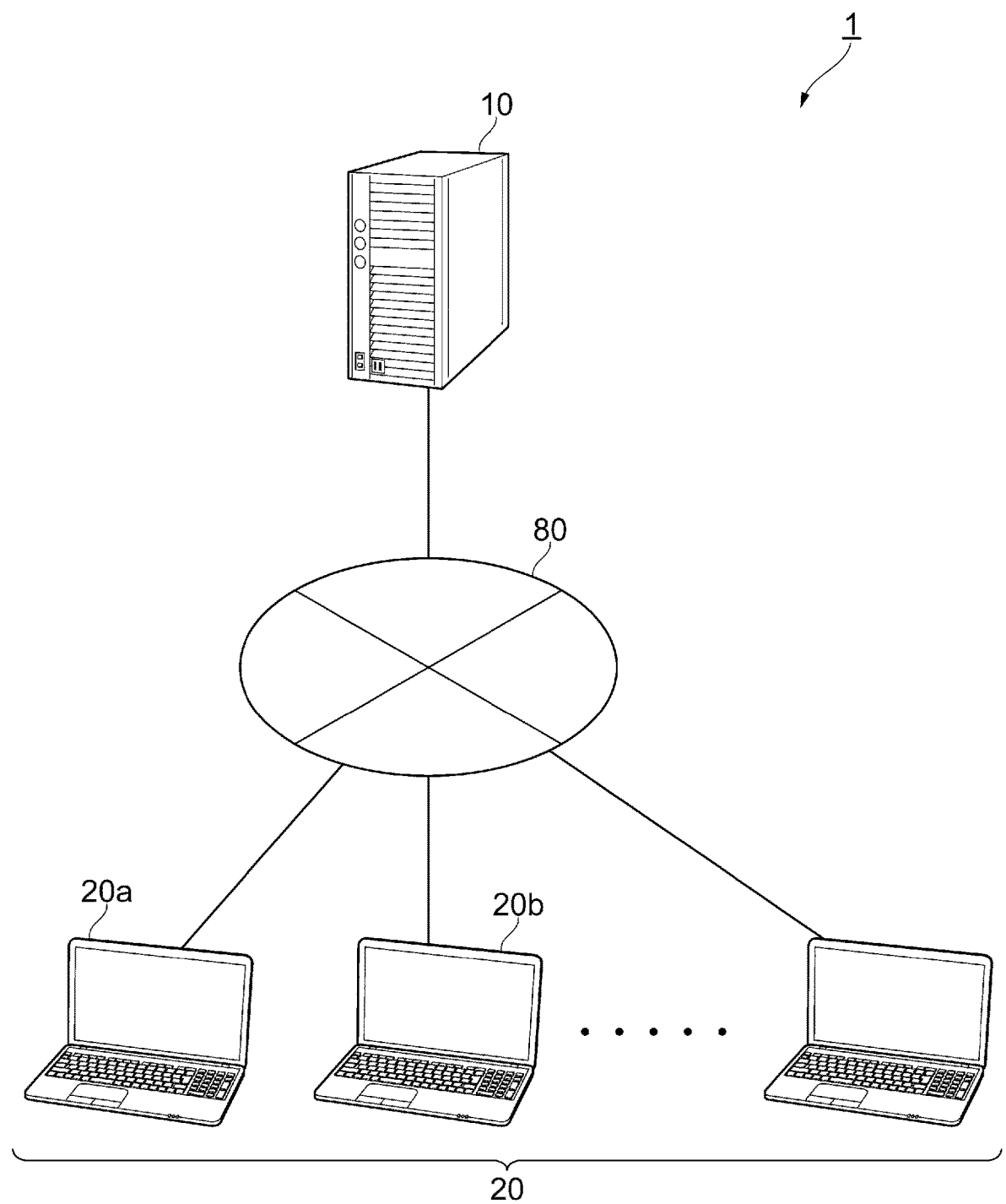
FIG. 1 is a diagram illustrating an example of the overall configuration of an information processing system according to an exemplary embodiment.

FIG. 1 is a diagram illustrating an example of the overall configuration of an information processing system 1 according to the present exemplary embodiment.

As illustrated in FIG. 1, the information processing system 1 is configured by connecting a server apparatus 10, which provides storage locations for storing documents, and a plurality of client apparatuses 20 (20*a*, 20*b*, . . . ), which are used by users, via communication lines 80. The communication lines 80 are, for examples, lines such as the Internet, and are used for communicating information between the server apparatus 10 and each of the client apparatuses 20.

Note that the term "document" in the present exemplary embodiment refers to an electronic document stored in the server apparatus 10 or the like. An electronic document is some information that has been digitized, and the type, format, and data structure of the information are not particularly restricted.

The server apparatus 10 is an information processing apparatus that provides storage locations for storing documents. The server apparatus 10 according to the present exemplary embodiment provides a document management service, a document processing service, and the like for the users of the client apparatuses 20.

Here, the server apparatus 10 according to the present exemplary embodiment performs the following as the document management service: in response to a request sent from each client apparatus 20, the server apparatus 10 stores a received document in its storage location, retrieves and sends the stored document, and the like.

The server apparatus 10 also performs the following as the document processing service: in response to a request sent from each client apparatus 20, the server apparatus 10 performs a process of changing the contents of a specified document, a process of creating, deleting, or duplicating a document, and the like.

Each client apparatus 20 is an information processing apparatus used by a user when using a service. Each client apparatus 20 to which the present exemplary embodiment is applied requests, on the basis of a user operation, the server apparatus 10 to perform a process of storing or retrieving a document, changing the contents of a document, and the like.

Examples of the client apparatuses 20 include personal computers, tablet terminals, and smartphones.

Hardware Configuration of Server Apparatus 10

Figure 2:
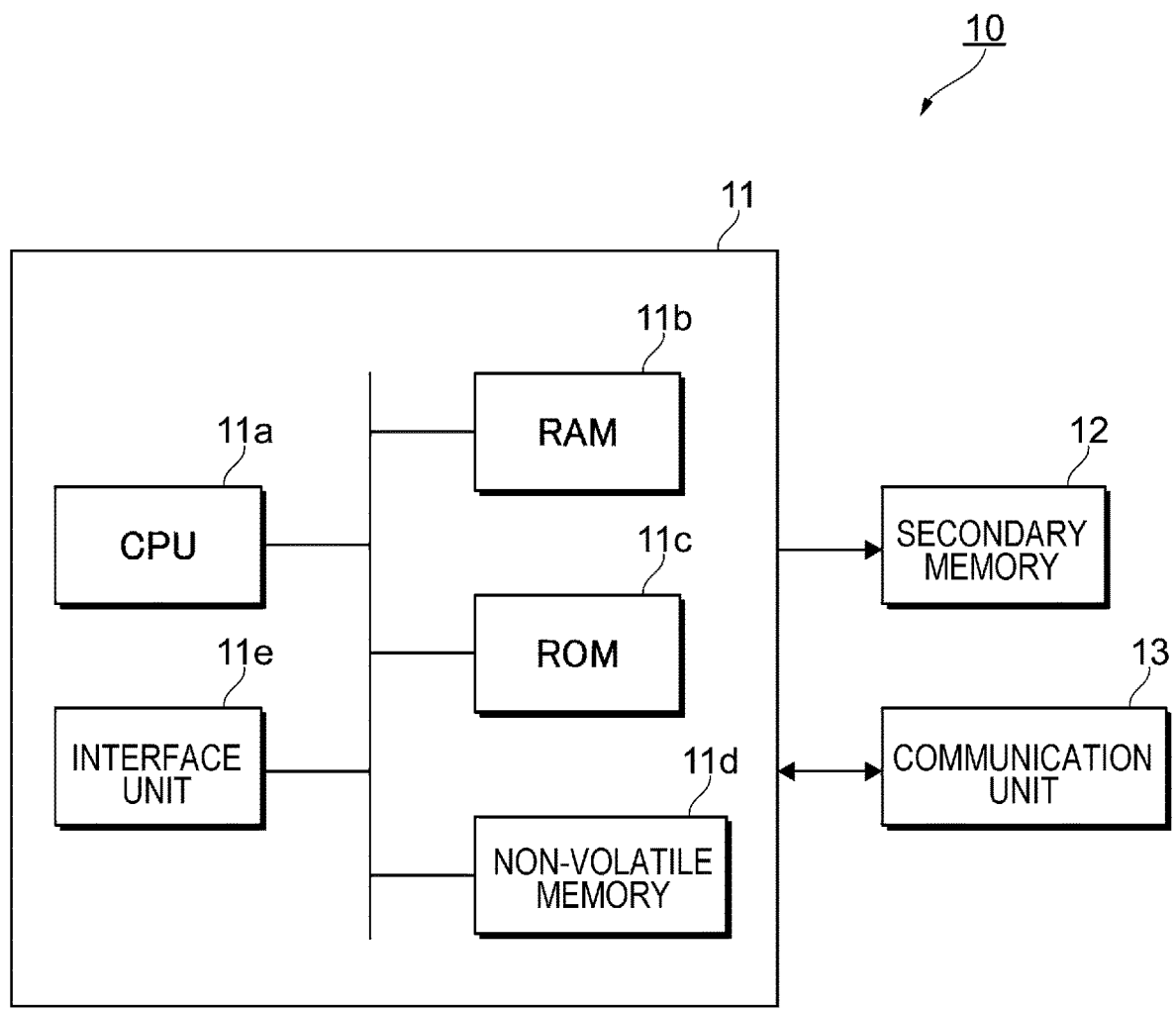
FIG. 2 is a diagram illustrating an example of the hardware configuration of a server apparatus according to the present exemplary embodiment.

FIG. 2 is a diagram illustrating an example of the hardware configuration of the server apparatus 10 according to the present exemplary embodiment.

As illustrated in FIG. 2, the server apparatus 10 according to the present exemplary embodiment includes an arithmetic processing unit 11, which executes digital arithmetic processing in accordance with a predetermined program when providing the document management service or the document processing service, a secondary memory 12, which is realized by, for example, a hard disk drive (HDD) where stored documents and the like are recorded, and a communication unit 13, which sends and receives information via the communication lines 80.

The arithmetic processing unit 11 includes a central processing unit (CPU) 11*a*, which is an example of a processor and controls the entire apparatus, a random-access memory (RAM) 11*b*, which is used as a work memory for the CPU 11*a*, and a read-only memory (ROM) 11*c*, which stores a document management program and the like executed by the CPU 11*a*. The arithmetic processing unit 11 also includes a non-volatile memory 11*d*, which is rewritable and capable of holding data even when power supply is interrupted, and an interface unit 11*e*, which controls units such as the communication unit 13 connected to the arithmetic processing unit 11. The non-volatile memory 11*d* includes, for example, static random access memory (SRAM) backed up by a battery, flash memory, or the like.

Besides the stored documents, a program executed by the arithmetic processing unit 11 is stored in the secondary memory 12. Each process of the server apparatus 10 according to the present exemplary embodiment is executed by reading, by the arithmetic processing unit 11, the program stored in the secondary memory 12.

In addition, in the present exemplary embodiment, data such as various images to be displayed on an operation screen 400 (described later) of each client apparatus 20, and annotation images 520 (described later) to be added to a document or a document image 420 are stored in the secondary memory 12.

Hardware Configuration of Client Apparatus 20

Figure 3:
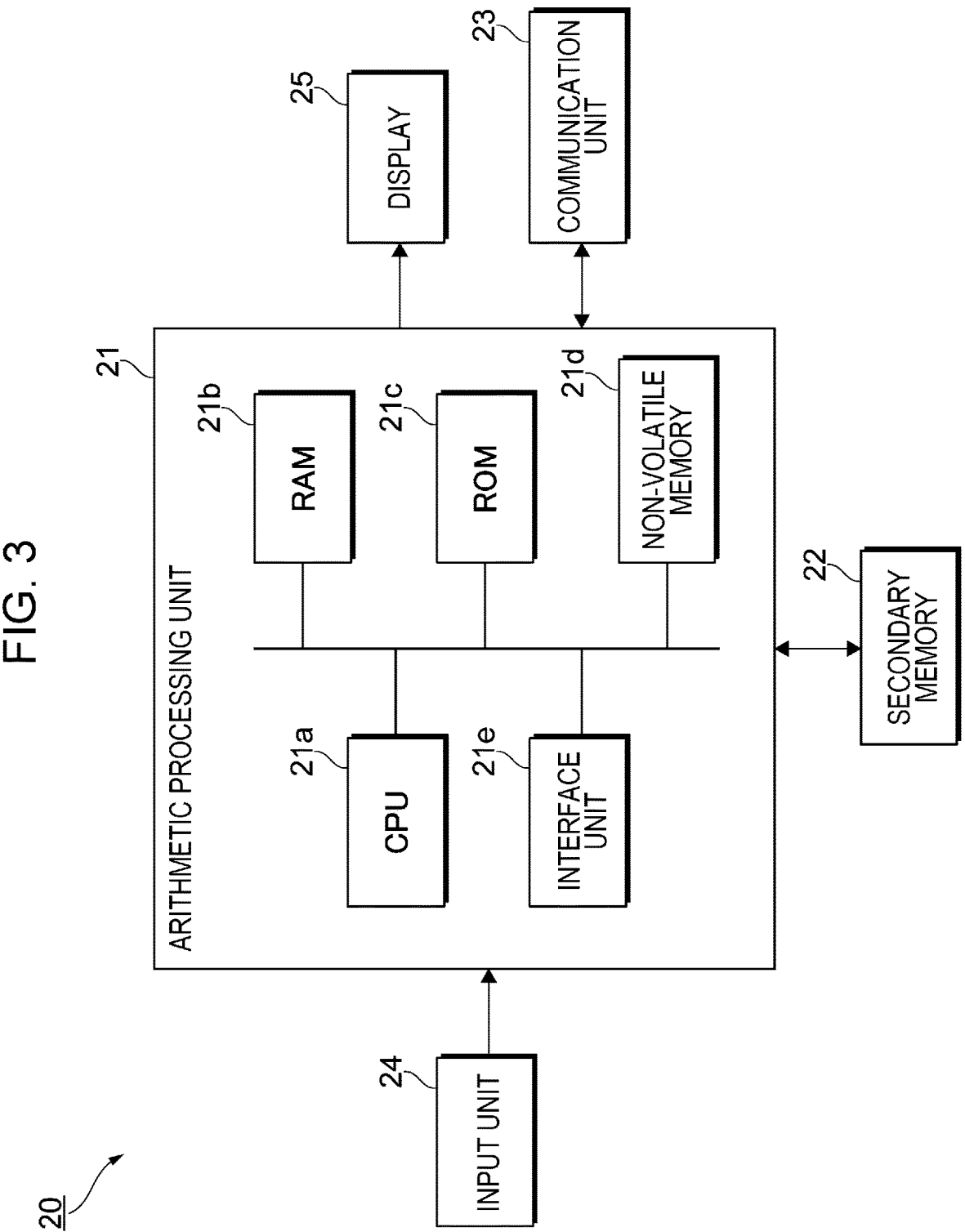
FIG. 3 is a diagram illustrating an example of the hardware configuration of a client apparatus to which the present exemplary embodiment is applied.

FIG. 3 is a diagram illustrating an example of the hardware configuration of each client apparatus 20 according to the present exemplary embodiment.

Each client apparatus 20 to which the present exemplary embodiment is applied includes an arithmetic processing unit 21, which executes digital arithmetic processing in accordance with a predetermined program when using a service provided by the server apparatus 10, a secondary memory 22, which is realized by, for example, an HDD where data received from the server apparatus 10 is stored, and a communication unit 23, which sends and receives information via the communication lines 80. In addition, each client apparatus 20 includes an input unit 24, which includes a keyboard, a pointing device, a touchscreen, etc. that accept input operations from the user, and a display 25, which includes a liquid crystal display (LCD) panel, an electroluminescence (EL) display panel, or the like that displays images and text information for the user.

The arithmetic processing unit 21 includes a CPU 21*a*, which is an example of a processor and controls the entire apparatus, a RAM 21*b*, which is used as a work memory for the CPU 21*a*, and a ROM 21*c*, which stores a processing program executed by the CPU 21*a*. The arithmetic processing unit 21 also includes a non-volatile memory 21*d*, which is rewritable and capable of holding data even when power supply is interrupted, and an interface unit 21*e*, which controls units such as the input unit 24 connected to the arithmetic processing unit 21. The non-volatile memory 21*d* includes, for example, SRAM backed by a battery, flash memory, or the like, and stores various requests for the server apparatus 10.

Besides data received from the server apparatus 10, a program executed by the arithmetic processing unit 21 is stored in the secondary memory 22. Each process of each client apparatus 20 according to the present exemplary embodiment is executed by reading, by the arithmetic processing unit 21, the program stored in the secondary memory 22.

The input unit 24 is a device such as a pointing device for the user to input an operation.

For example, in the case where the input unit 24 is a mouse, the user performs a cursor moving operation and/or a click operation, thereby specifying the coordinates and position on the screen of the display 25, displayed text and image, and the like. Alternatively, in the case where the input unit 24 is a touchscreen, the user performs an operation of bringing the user's finger into contact with the touchscreen and an operation of keeping the finger in contact with the touchscreen longer than a predetermined time, thereby specifying the coordinates and position on the screen of the display 25, and a displayed image. In this case, the input unit 24 is provided integrally with the display 25.

Besides the above-mentioned pointing device and the like, the input unit 24 may include a keyboard that performs a key input operation.

In the present exemplary embodiment, operations in the case where a mouse is used as the input unit 24 will be basically described.

Here, the programs executed by the CPUs 11a and 21a, which are examples of a processor, are provided to the arithmetic processing units 11 and 21, respectively, by being stored in a computer readable recording medium, such as a magnetic recording medium (magnetic tape, magnetic disk, etc.), an optical recording medium (optical disk, etc.), a magneto-optical recording medium, or semiconductor memory. Alternatively, the programs executed by the CPUs 11a and 21a may be downloaded using communication means such as the Internet.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Figure 4:
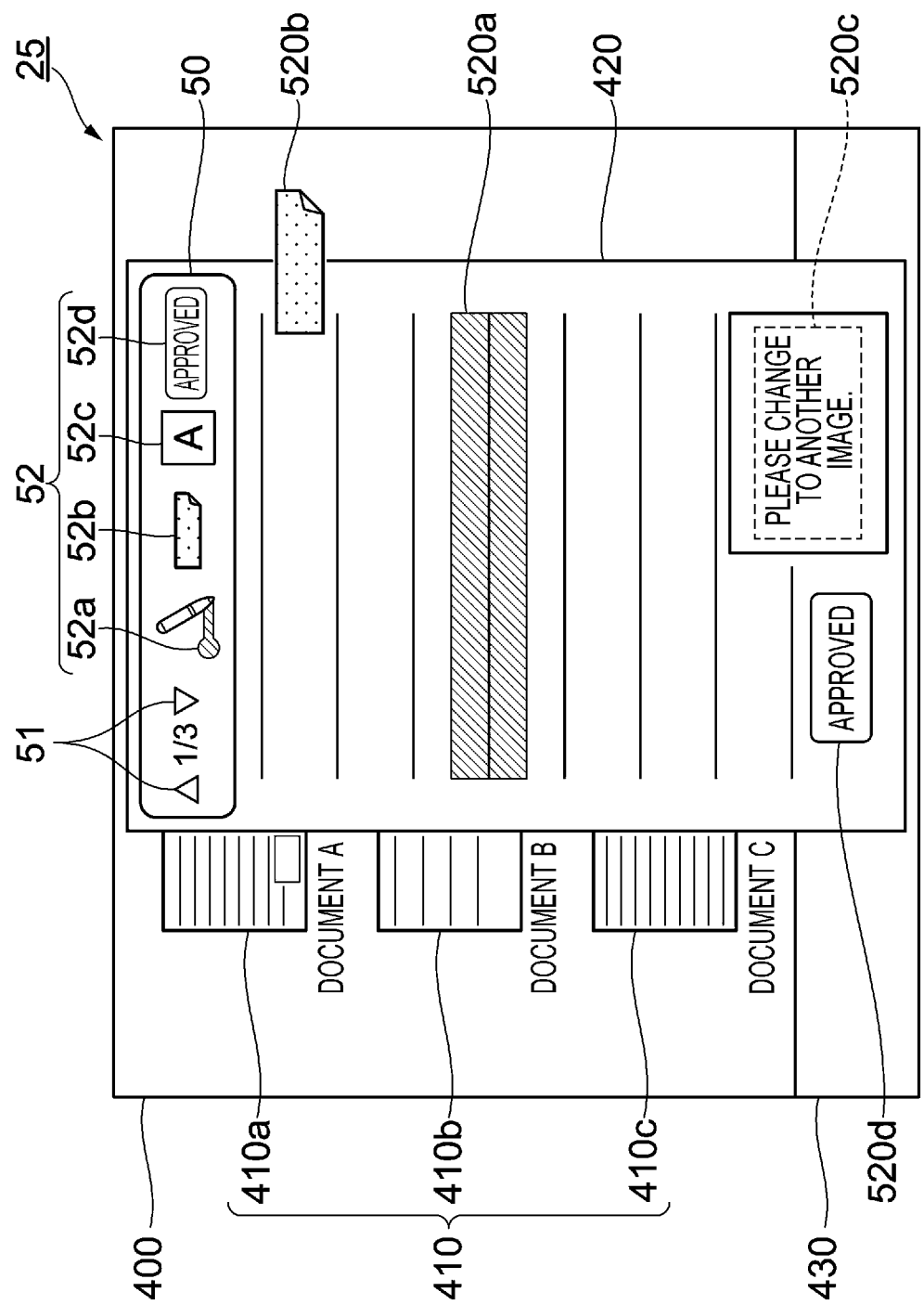
FIG. 4 is a diagram illustrating an example of an operation screen of the client apparatus.

FIG. 4 is a diagram illustrating an example of the operation screen 400 according to the present exemplary embodiment.

The display 25 of each client apparatus 20 displays the operation screen 400, which accepts a user operation, as illustrated in FIG. 4. The operation screen 400 is a workspace provided when using the document management service or the document processing service. On the operation screen 400, for example, documents A, B, C, . . . managed by the document management service are displayed as a list using document icons 410a, 410b, 410c, (hereinafter they may be collectively referred to as "document icons 410"). Note that the document icons 410 will be described in detail later.

On the operation screen 400, besides the document icons 410, the document image 420, which is an image corresponding to the contents of a document, a menu image 50, which displays various processes related to the document or the document image 420 as a menu, and a tool bar 430, which is prepared for simplifying operations on the document, are displayed. Note that operations on the document include operations of saving, printing, rotating, searching, and encrypting the document, and an operation of combining two or more documents.

In addition, text such as the name of a corresponding document may be displayed in association with a corresponding one of the document icons 410 on the operation screen 400, as illustrated in FIG. 4. The text may also be displayed in association with the document image 420.

Each document icon 410 is an image for accepting an operation of specifying a document. More specifically, each document icon 410 accepts an operation of specifying a document that corresponds to itself, among documents managed by the document management service. In addition, in the present exemplary embodiment, in response to specification of the document, the document icon 410 accepts an instruction to display a corresponding document image 420. By performing a mouse-over operation (described later using FIGS. 10A and 10B) on, for example, the document icon 410a, the user gives an instruction to display a document image 420 corresponding to the document A.

Besides thumbnail images prepared for the individual documents, common images according to document types may be used as the document icons 410.

The document image 420 is an image corresponding to a document specified by the user. The document image 420 includes, for example, the contents of a certain page of the document. In the example illustrated in FIG. 4, an image including the contents of the first page of the document A, which consists of three pages, is displayed as the document image 420. By checking the document image 420, the user may browse the contents without receiving the document from the server apparatus 10. In the case of displaying thumbnail images as the document icons 410, the document image 420 may be an enlarged image of a corresponding thumbnail image.

Here, the size and position for displaying the document image 420 are not restricted to the example illustrated in FIG. 4. The size and position for displaying the document image 420 may be changed on the basis of, for example, the shape and size of the display 25 and the operation screen 400, user settings, and the like.

The menu image 50 is an image that displays various processes related to the document or the document image 420 as a menu, and includes instruction images for giving instructions to perform these various processes. In the example illustrated in FIG. 4, the menu image 50 includes page change icons 51 and annotation icons 52 (52a, 52b, 52c, 52d, . . . ) as the instruction images.

The page change icons 51 are instruction images for giving an instruction to perform a process of changing the page to be displayed as the document image 420 of a document consisting of a plurality of pages.

The annotation icons 52 are instruction images for giving instructions to perform a process of adding annotations, that is, the so-called addition of annotations, to the document image 420. In the present exemplary embodiment, a click operation on one of the annotation icons 52 gives an instruction to add a corresponding annotation, and the mode shifts to an annotation adding mode. In the annotation adding mode, a click operation on the document image 420 causes the position at which the click operation has been performed to be determined as a position to add an annotation. Note that the annotation adding mode will be described in detail later.

In the example illustrated in FIG. 4, the marker icon 52a, the sticky note icon 52b, the text icon 52c, and the stamp icon 52d are displayed as the annotation icons 52. The marker icon 52a is an instruction image for giving an instruction to perform a process of adding a straight line marker image 520a between two determined positions. In addition, the sticky note icon 52b is an instruction image for giving an instruction to perform a process of adding a sticky note image 520b as a digitized sticky note at a determined position. Furthermore, the text icon 52c is an instruction image for giving an instruction to perform a process of adding a text annotation 520c, which is an annotation using text, at a determined position. Yet furthermore, the stamp icon 52d is an instruction image for giving an instruction to perform a process of adding a stamp image 520d as a digitized seal or stamp at a determined position.

Note that the marker image 520a, the sticky note image 520b, the text annotation 520c, the stamp image 520d, etc., which are added as annotations, will be collectively referred to as the annotation images 520.

As described above, the addition of an annotation according to the present exemplary embodiment is an example of a process of adding an annotation using an image or text at a position on the document image 420 determined by a user operation, and an example of a process involving determination of a position on the operation screen 400 by a user operation. Note that the number of positions determined when adding an annotation may be two or more, as in the case of adding the marker image 520a.

In addition, the types of annotations to be added are not restricted to the above-described example. For example, the addition of an annotation may be a process of adding a rectangular image with two determined positions as opposite angles, or a process of adding a curve image corresponding to a plurality of positions determined consecutively by a drag operation.

Functional Configuration of Server Apparatus 10

Next, the functional configuration of the server apparatus 10 will be described.

Figure 5:
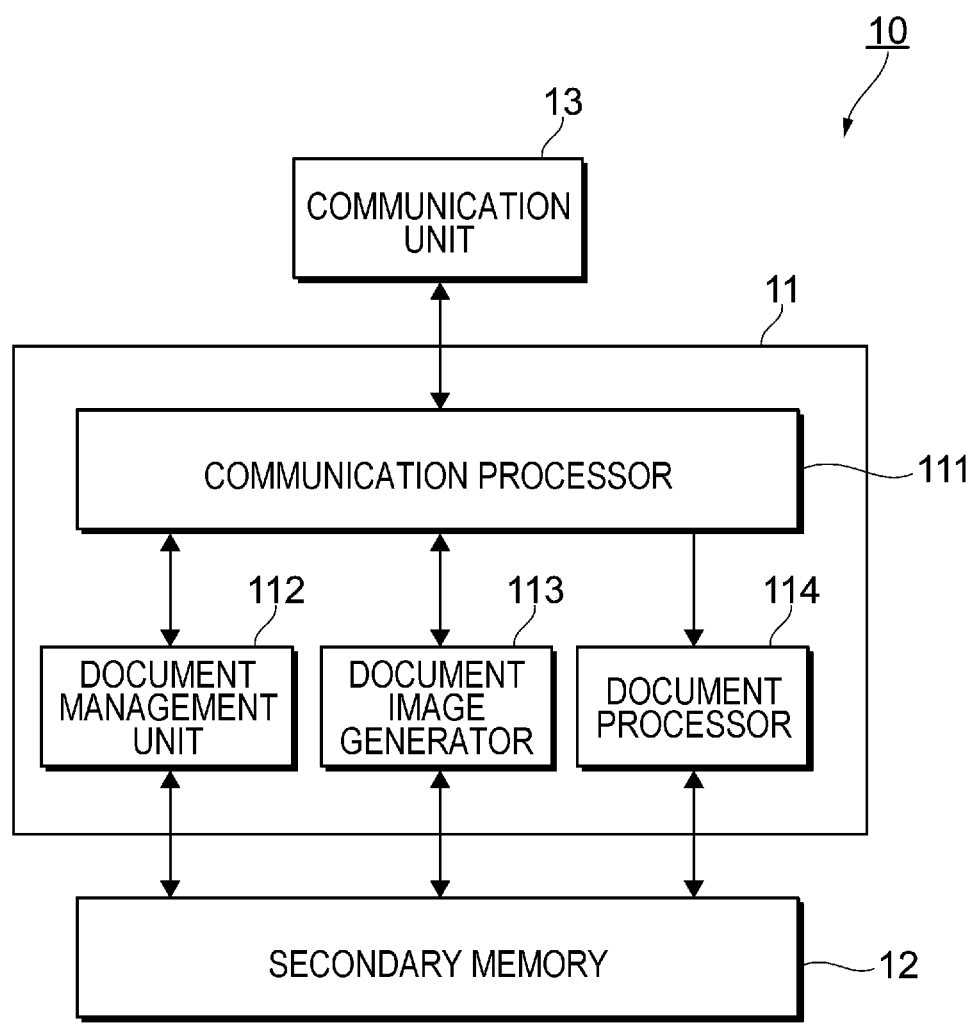
FIG. 5 is a diagram illustrating an example of the functional configuration of the server apparatus.

FIG. 5 is a diagram illustrating an example of the functional configuration of the server apparatus 10. As illustrated in FIG. 5, the server apparatus 10 includes a communication processor 111, a document management unit 112, a document image generator 113, and a document processor 114, which are realized by the arithmetic processing unit 11. Note that the same reference numeral is given to the same configuration as FIG. 2, and a description thereof is omitted.

The communication processor 111 processes information sent or received by the communication unit 13.

In addition, the communication processor 111 obtains a request for the server apparatus 10 from information that has been sent from each client apparatus 20 on the basis of a user operation and that has been received by the communication unit 13. The communication processor 111 instructs the document management unit 112, the document image generator 113, and the document processor 114 to respond to the obtained request.

Furthermore, in response to the request from the client apparatus 20, the communication processor 111 performs a process of sending data and information generated or obtained by the document management unit 112, the document image generator 113, and the document processor 114.

As the document management service provided by the server apparatus 10, the document management unit 112 manages a document on the basis of a request from each client apparatus 20. For example, in the case where the storage of a document is requested by one of the client apparatuses 20, the document management unit 112 performs a process of storing the received document in its storage location in the secondary memory 12. In addition, for example, in the case where sending of the stored document is requested by the client apparatus 20, the document management unit 112 performs a process of retrieving the document stored in its storage location in the secondary memory 12. Then, the document management unit 112 instructs the communication processor 111 to send the retrieved document to the client apparatus 20.

The document image generator 113 generates a document image 420 corresponding to a document stored in its storage location. For example, in the case where one of the client apparatuses 20 specifies a document and requests a document image 420, the document image generator 113 performs a process of retrieving the document from its storage location in the secondary memory 12, referring to the document, and generating a corresponding document image 420. The document image generator 113 instructs the communication processor 111 to send the generated document image 420 to the client apparatus 20.

As the document processing service provided by the server apparatus 10, the document processor 114 processes a document specified on the basis of a request from each client apparatus 20. For example, in the case where one of the client apparatuses 20 requests the addition of an annotation to a document, the document processor 114 performs a process of retrieving the document from its storage location in the secondary memory 12, adding a specified type of annotation image 520 at a specified position in the document, and again storing the document in the storage location. Note that this series of processes of retrieval of a document, addition of an annotation, and storage is referred to as an "update of the document".

For example, in the case where one of the client apparatuses 20 requests the deletion or copying of a document, the document processor 114 retrieves the document from its storage location in the secondary memory 12, and deletes or copies the target document.

Functional Configuration of Client Apparatus 20

Next, the functional configuration of each client apparatus 20 to which the present exemplary embodiment is applied will be described.

Figure 6:
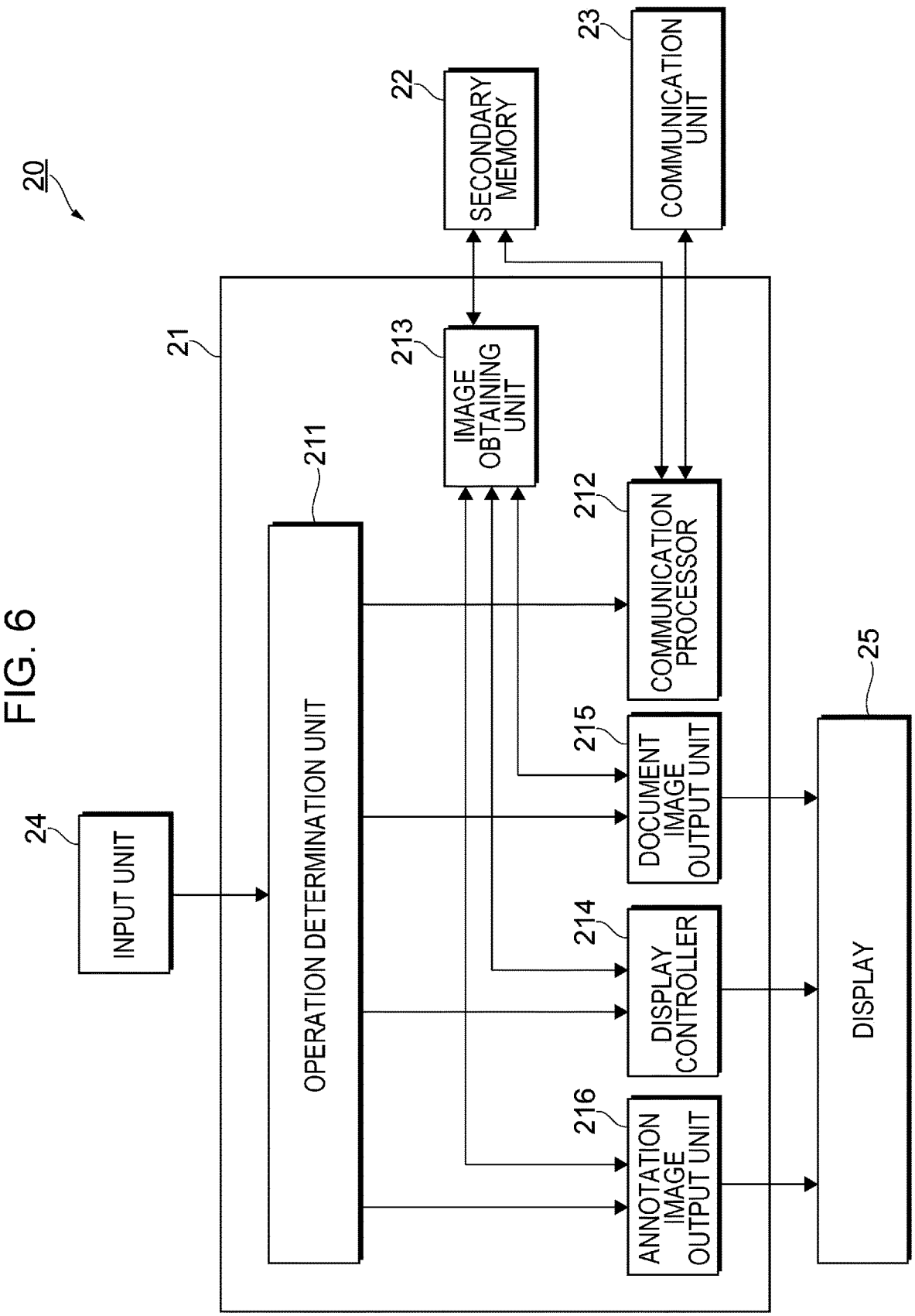
FIG. 6 is a diagram illustrating an example of the functional configuration of the client apparatus.

FIG. 6 is a diagram illustrating an example of the functional configuration of each client apparatus 20. As illustrated in FIG. 6, each client apparatus 20 includes an operation determination unit 211, a communication processor 212, an image obtaining unit 213, a display controller 214, a document image output unit 215, and an annotation image output unit 216, which are realized by the arithmetic processing unit 21. Note that the same reference numeral is given to the same configuration as FIG. 3, and a description thereof is omitted.

The operation determination unit 211 determines whether a user operation via the input unit 24 has been performed on the operation screen 400 (see FIG. 4). The user operation includes, for example, a cursor moving operation of changing the coordinates to be specified on the operation screen 400, a mouse-over operation or a click operation for specifying an image or an icon or determining a position, a drag operation, and the like. In addition, in the case where an operation of specifying the addition of an annotation to the document image 420 and an operation of determining a position to add one of the annotation images 520 are performed, the operation determination unit 211 generates annotation addition information indicating the type of annotation to be added and the determined position.

The communication processor 212 processes information sent or received by the communication unit 23.

On the basis of a user operation determined by the operation determination unit 211, the communication processor 212 makes a request for the server apparatus 10. For example, in the case where the user performs an operation to start using the document management service or the document processing service, the communication processor 212 requests various images to be displayed on the operation screen 400 and one of the annotation images 520 to be added to the document image 420 from the server apparatus 10. In addition, for example, in the case where the user performs an operation of specifying one of the document icons 410, the communication processor 212 requests a corresponding document image 420 from the server apparatus 10.

In addition, the communication processor 212 performs a process of storing an image, a document, etc. sent by the server apparatus 10 in response to the request in the secondary memory 22.

In accordance with an instruction from the display controller 214, the document image output unit 215, or the annotation image output unit 216, the image obtaining unit 213 retrieves from the secondary memory 22 an image to be displayed on the operation screen 400.

Besides displaying an image, text, etc. retrieved by the image obtaining unit 213 from the secondary memory 22 on the operation screen 400 on the basis of contents determined by the operation determination unit 211, the display controller 214 controls the display mode such as the size and position of the displayed image, text, etc.

On the basis of the determination by the operation determination unit 211 that one of the document icons 410 has been specified, the document image output unit 215 instructs the image obtaining unit 213 to retrieve a corresponding document image 420 from the secondary memory 22. The document image output unit 215 outputs the retrieved document image 420 to the display 25, and the display 25 displays the document image 420.

On the basis of the determination by the operation determination unit 211 that one of the annotation icons 52 has been specified, the annotation image output unit 216 instructs the image obtaining unit 213 to retrieve a corresponding annotation image 520 from the secondary memory 22. The annotation image output unit 216 outputs the retrieved annotation image 520 to the display 25, and the display 25 displays the annotation image 520 at a position on the document image 420 determined by a user operation, thereby adding an annotation to the document image 420.

Use of Document Processing Service

Next, processes performed by the server apparatus 10 and each client apparatus 20 when using the document processing service will be described using FIGS. 4 to 10.

Figure 7:
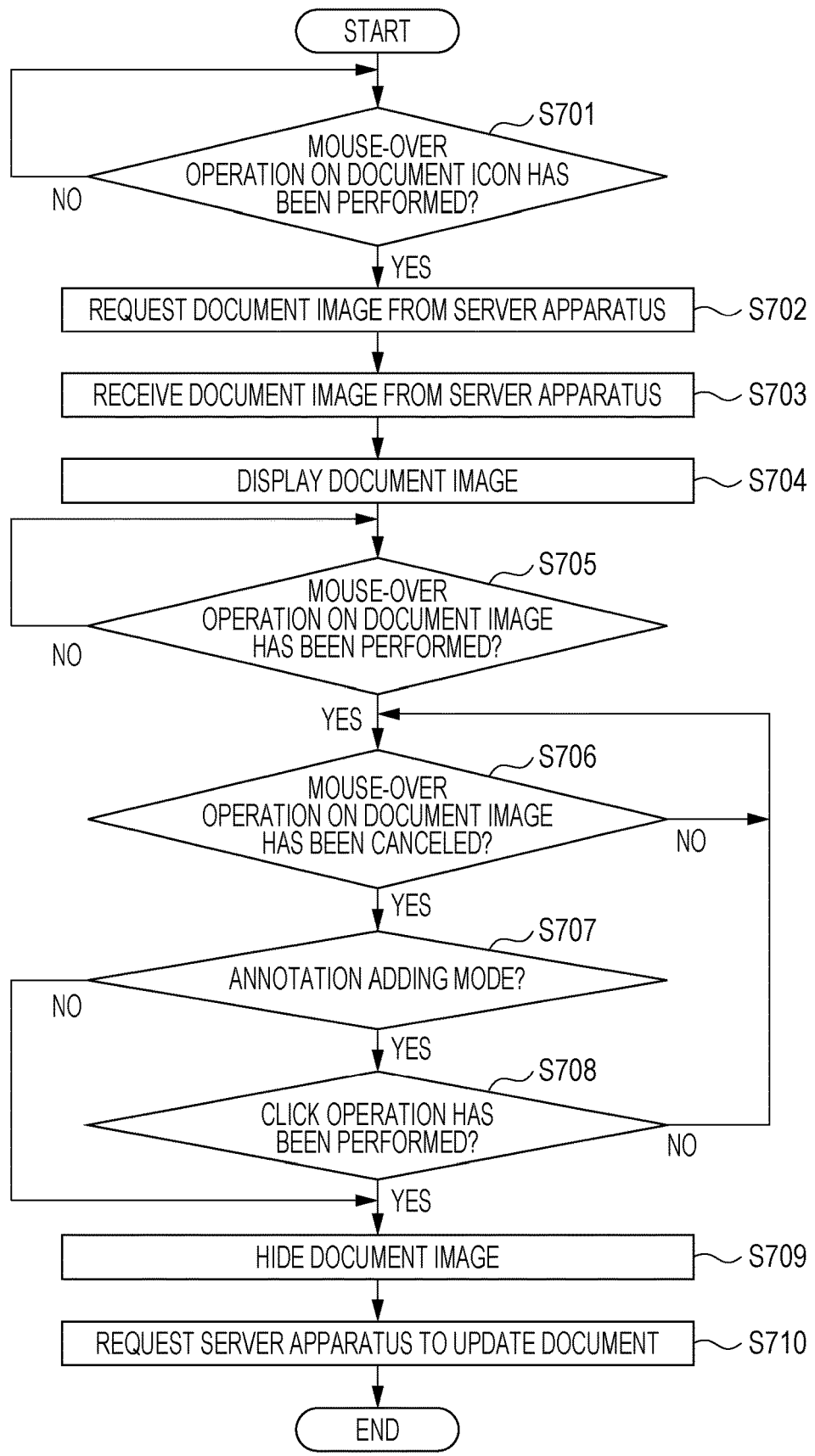
FIG. 7 is a flowchart illustrating an example of a procedure, performed by the client apparatus, related to the displaying of a document image.

FIG. 7 is a flowchart illustrating an example of a procedure, performed by each client apparatus 20, related to the displaying of the document image 420.

FIG. 8 is a flowchart illustrating an example of a procedure performed by the server apparatus 10.

FIG. 9 is a flowchart illustrating an example of a procedure, performed by each client apparatus 20, related to the addition of an annotation to the document image 420.

Figure 10B:
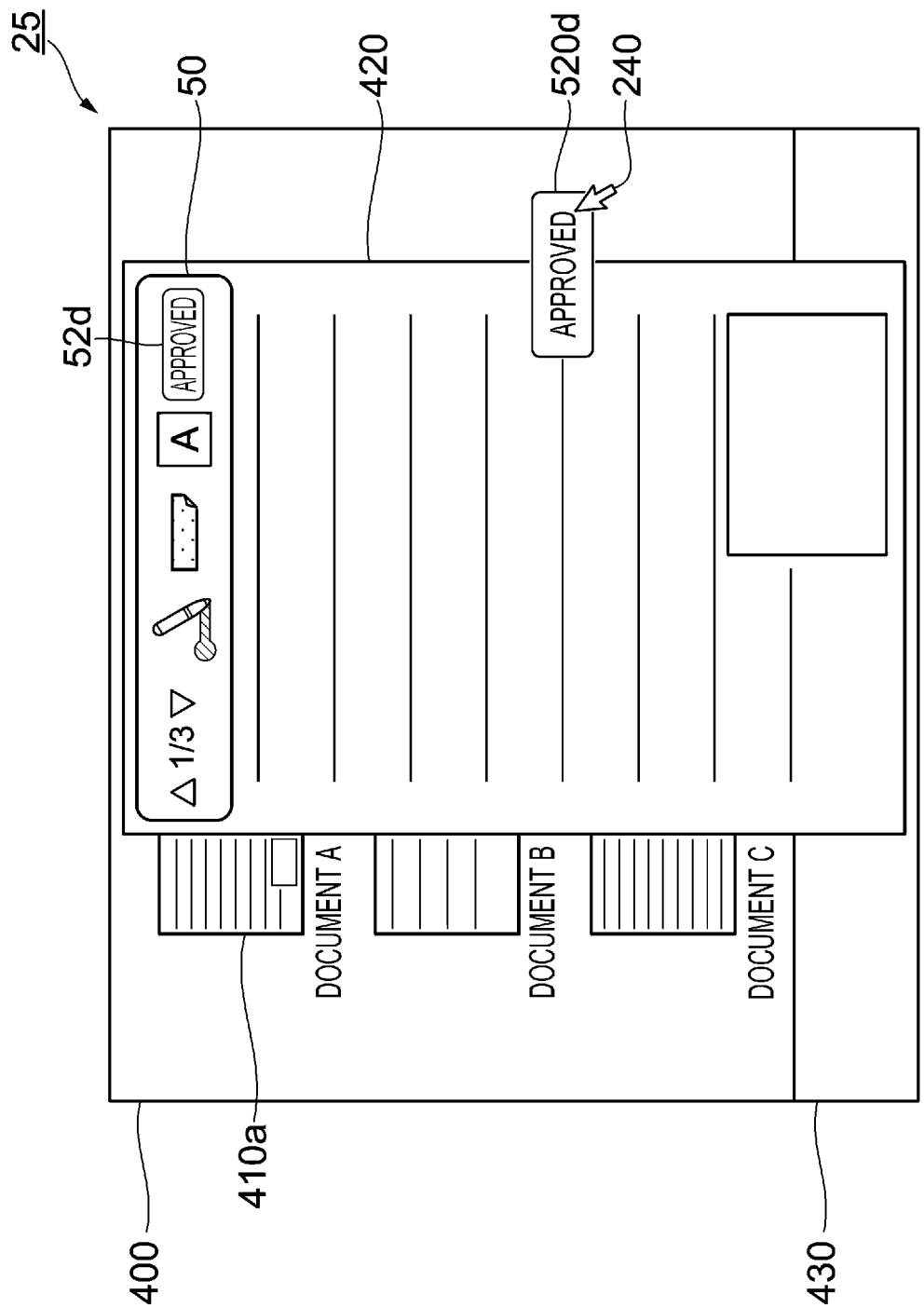

FIGS. 10A and 10B are diagrams illustrating display examples of the operation screen 400 when using the document processing service; that is, FIG. 10A illustrates a display example of a state where the document image 420 is displayed, and FIG. 10B illustrates a display example of a state where the mode has now shifted to the annotation adding mode.

In FIGS. 7 to 10, the same reference numeral is given to the same configuration as FIGS. 1 to 6, and a description thereof is omitted.

As illustrated in FIGS. 10A and 10B, the display 25 according to the present exemplary embodiment displays, in addition to the operation screen 400 and the document image 420, a cursor 240 that indicates the coordinates on the screen. The cursor 240 moves in response to a user operation input via the input unit 24 such as a mouse. In the present exemplary embodiment, the user performs an operation of indicating, with the cursor 240, the coordinates the user wants to specify, thereby specifying the coordinates as the specified coordinates. Note that an operation of specifying coordinates within the display area of an image or text as the specified coordinates will be referred to as a "mouse-over operation" on the image or text.

Here, in the present exemplary embodiment, the document image 420 is displayed in response to a mouse-over operation on one of the document icons 410. In addition, in order to switch between displaying and hiding of the document image 420 with a simple operation, it is configured that, after a mouse-over operation is performed on the displayed document image 420, if the mouse-over operation is canceled, the document image 420 is hidden. In other words, in the case where an operation of removing the specified coordinates indicated by the cursor 240 from the display area of the document image 420, which is an example of a predetermined area, the document image 420 is hidden.

Process Related to Displaying of Document Image 420

Referring to FIG. 7, at first, the operation determination unit 211 of each client apparatus 20 determines whether a mouse-over operation on one of the document icons 410 has been performed (step S701). Like the cursor 240 (position C) illustrated in FIG. 10A, in the case where no mouse-over operation has been performed on any of the document icons 410 (NO in step S701), the process waits until one of the document icons 410 is specified. Like the cursor 240 (position A), in the case where a mouse-over operation on the document icon 410*a* has been performed (YES in step S701), the process accepts this as an instruction to display a document image 420. On the basis of the instruction, the communication processor 212 requests a document image 420 corresponding to the document A from the server apparatus 10 (step S702).

Referring to FIG. 8, the communication processor 111 of the server apparatus 10 obtains the request for a document image 420 from the client apparatus 20 (step S801). In step S802, the document image generator 113 retrieves the specified document A from the secondary memory 12, and generates a corresponding document image 420. In the case where the document A is a document consisting of a plurality of pages, the document image generator 113 first generates the document image 420 of the first page of the document.

In step S803, the communication processor 111 sends the generated document image 420 to the client apparatus 20. In step S804, the communication processor 111 determines whether the document image 420 of the last page of the document A has been sent. In the case where the document image 420 of the last page has not been sent (NO in step S804), for example, in the case where the document image 420 corresponding to the first page of the document A has been sent, the process returns to step S802, and generates a document image 420 of the second page onward. In this manner, the processing in steps S802 to S804 is repeated until the document images 420 of the first page to the last page of the document A are generated. In the case where the document image 420 of the last page has been sent (YES in step S804), the process proceeds to step S805, and waits for a request from the client apparatus 20.

Referring back to FIG. 7, the communication processor 212 of the client apparatus 20 receives the document image 420 from the server apparatus 10 (step S703), and stores the document image 420 in the secondary memory 22. The document image output unit 215 retrieves the document image 420, and outputs the document image 420 to the display 25 to be displayed (step S704). As illustrated in FIG. 10A, in the present exemplary embodiment, the menu image 50 is displayed within the display area of the document image 420.

In step S705, the operation determination unit 211 determines whether a mouse-over operation on the document image 420 has been performed. In other words, the operation determination unit 211 determines whether the specified coordinates are within the display area of the document image 420. As indicated by the cursor 240 (position A) illustrated in FIG. 10A, in the case where no mouse-over operation on the document image 420 has been performed (NO in step S705), the document image 420 continues to be displayed. As indicated by the cursor 240 (position B) illustrated in FIG. 10A, in the case where a mouse-over operation on the document image 420 has been performed (YES in step S705), the process proceeds to step S706.

In step S706, the operation determination unit 211 determines whether the mouse-over operation on the document image 420 has been canceled. In other words, the operation determination unit 211 determines whether an operation of removing the specified coordinates from the display area of the document image 420 has been performed. In the case where the mouse-over operation on the document image 420 has not been canceled (NO in step S706), the document image 420 continues to be displayed. For example, in the case where an operation of moving the cursor 240 from the position B to the position C in FIG. 10A has been performed to cancel the mouse-over operation on the document image 420 (YES in step S706), the process proceeds to step S707.

Even in the case where the mouse-over operation on the document image 420 has been canceled, if a mouse-over operation is consecutively performed on the document icon 410*a* (that is, without going through the state where the cursor 240 is removed from both the display area of the document image 420 and the display area of the document icon 410*a*), the document image 420 may be continuously displayed. The process after that is the same as the case where the process proceeds to step S702.

In step S707, the operation determination unit 211 determines whether the mode is the annotation adding mode. In the present exemplary embodiment, it is determined whether it is after an instruction to add an annotation is given by clicking on one of the annotation icons 52, and whether the process is waiting for a click operation of determining a position to add an annotation. In the case where the mode is not the annotation adding mode (NO in step S707), the process proceeds to step S709, and the document image 420 is hidden. In the case where the mode is the annotation adding mode (YES in step S707), the process proceeds to step S708.

In step S708, the operation determination unit 211 determines whether a click operation has been performed. In the case where no click operation has been performed (NO in step S708), the process returns to step S706, and the document image 420 continues to be displayed. In the case where a click operation has been performed (YES in step S708), the process proceeds to step S709, and the document image 420 is hidden.

As indicated in steps S708 and S709, in the present exemplary embodiment, in the annotation adding mode, in the case where a click operation for determining a position to add an annotation has been performed outside the display area of the document image 420, the document image 420 is hidden. By using the same operation for hiding the document image 420 and determining the position, an operation of hiding the document image 420 may be performed more smoothly than the case of using different operations.

Note that an annotation may be added to the document image 420 from when the document image 420 is displayed to when the document image 420 is hidden (steps S704 to S709). A process related to this annotation addition will be described in detail later using FIG. 9.

In step S710, the communication processor 212 requests the server apparatus 10 to update the document. More specifically, the communication processor 212 sends annotation addition information to the server apparatus 10, and requests the server apparatus 10 to similarly add the annotation image 520 that has been added to the document image 420 at a corresponding position of a corresponding page of the document A.

Referring to FIG. 8, the communication processor 111 of the server apparatus 10 obtains the document update request from the client apparatus 20 (step S806). In step S807, the document processor 114 refers to the annotation addition information received from the client apparatus 20, and updates the document.

With the above procedure, the process related to the displaying of the document image 420 ends.

Process Related to Addition of Annotation to Document Image

Next, a process of adding an annotation to the document image 420, which is performed from when the document image 420 is displayed to when the document image 420 is hidden, will be described.

Referring to FIG. 9, while the document image 420 and the menu image 50 are being displayed, the operation determination unit 211 determines whether a click operation on one of the annotation icons 52 (see FIG. 4) has been performed (step S901). In the case where no click operation has been performed on any of the annotation icons 52 (NO in step S901), the process waits for a user operation. In the case where a click operation on one of the annotation icons 52 has been performed (YES in step S901), the mode shifts to the annotation adding mode (S902), and the process waits for determination of a position to add a corresponding annotation image 520.

For example, when a click operation is performed on the stamp icon 52*d* illustrated in FIG. 10B, the mode shifts to the annotation adding mode, and the process waits for determination of a position to add the stamp image 520*d*. At this time, by configuring the stamp image 520*d* to follow the movement of the cursor 240, the user may easily grasp at which position the stamp image 520*d* will be added.

In the present exemplary embodiment, in a click operation on one of the annotation icons 52 or determination of a position to add the annotation image 520, a mouse-over operation on the document image 420 is performed (YES in step S705 illustrated in FIG. 7). However, in the annotation adding mode, as illustrated in FIG. 10B, even in the case where an operation of removing the cursor 240 from the display area of the document image 420 is performed, if no click operation is performed at that position, the document image 420 continues to be displayed (YES in step S706, YES in step S707, and NO in step S708, which are illustrated in FIG. 7).

Referring back to FIG. 9, in step S903, the operation determination unit 211 determines whether a click operation has been performed within the display area of the document image 420. Note that, as in the case of adding the marker image 520a (see FIG. 4), in a process involving determination of a plurality of positions, it is determined whether a necessary number of click operations have been performed. In the case where no click operation(s) has been performed (NO in step S903), the annotation adding mode continues. In the case where a click operation has been performed within the display area of the document image 420 (YES in step S903), the corresponding annotation image 520 is added at a position where the click operation has been performed (step S904), and the annotation adding mode is canceled (step S905).

In this manner, the process related to the addition of an annotation to the document image 420 ends. After that, the document A is updated by performing the processing in steps S706 to S710 illustrated in FIG. 7 and steps S806 and S807 illustrated in FIG. 8.

By using the above-described document processing service, the user is able to add an annotation to a document even in the case where the user's client apparatus 20 is not equipped with a program for opening and editing a document. In addition, because a document may be processed while being stored in the server apparatus 10 without downloading the document to each client apparatus 20, this saves the trouble of downloading and storing a document in the case of processing the same document by a plurality of client apparatuses 20.

In addition, each client apparatus 20 according to the present exemplary embodiment is configured to shift to the annotation adding mode, which is an example of a standby state, when the user gives an instruction to add an annotation, and not to hide the document image 420 in the annotation adding mode even if an operation of removing the specified coordinates from the display area of the document image 420 is performed. With such a configuration, even in the case of adding an annotation, which is a process involving the determination of a position, deterioration of user operability due to the fact that the document image 420 is unintentionally hidden may be suppressed, as compared with the case where the document image 420 is hidden by canceling the specification of a document.

Furthermore, each client apparatus 20 according to the present exemplary embodiment performs, in the annotation adding mode, a process of adding the annotation image 520, which is an image or text, at a determined position on the document image 420. With such a configuration, the document image 420 is suppressed from being unintentionally hidden when determining a position to add an annotation.

Furthermore, as a process for similarly adding the annotation image 520 that has been added to the document image 420 at a corresponding position of a corresponding document, the server apparatus 10 is requested to update the document. In this way, the addition of an annotation to a document is facilitated, as compared with the case of not adding the annotation image 520 that has been added to the document image 420 to a document. In this aspect, the document image 420 also functions as an image for accepting the addition of an annotation to a corresponding document.

MODIFICATIONS

Cancelation of Annotation Adding Mode

In the above-described exemplary embodiment, as indicated in steps S903 to S905 illustrated in FIG. 9, by performing an operation of determining a position, an annotation is added, and the annotation adding mode is canceled. With such a configuration, the document image 420 may be easily hidden after the process is performed, as compared with the case where the annotation adding mode is not canceled even if an operation of determining a position is performed.

Note that an operation of determining a position is an example of a cancelation condition for canceling the annotation adding mode, and it may be configured to cancel the annotation adding mode in the case where another operation is performed, such as in the case where a predetermined key operation is performed. As described above, by configuring the annotation adding mode to be canceled when a cancelation condition related to a user operation is satisfied, the user may arbitrarily switch between displaying and hiding of the document image 420. Note that a plurality of cancelation conditions may be set.

In addition, it may be configured that, in the case where a predetermined operation such as a double-click operation on one of the annotation icons 52 or a predetermined key operation is performed by the user, the annotation adding mode is not canceled even if an operation of determining a position is performed and the annotation image 520 is added (this state may be referred to as a "continuous mode" hereinafter). For example, in FIG. 10B, in the case where a predetermined operation is performed and then a position to add the first stamp image 520d is determined, it may be configured to wait for determination of a position(s) to add the second stamp image 520d and so on without canceling the annotation adding mode. With such a configuration, as compared with the case where the annotation adding mode is always canceled when an operation of determining a position is performed, continuous processing of the document image 420 is facilitated.

Hiding Document Image

In the above-described exemplary embodiment, the document image 420 is hidden in the case where a click operation is performed outside the display area of the document image 420. However, exceptions may be made.

Figure 11:
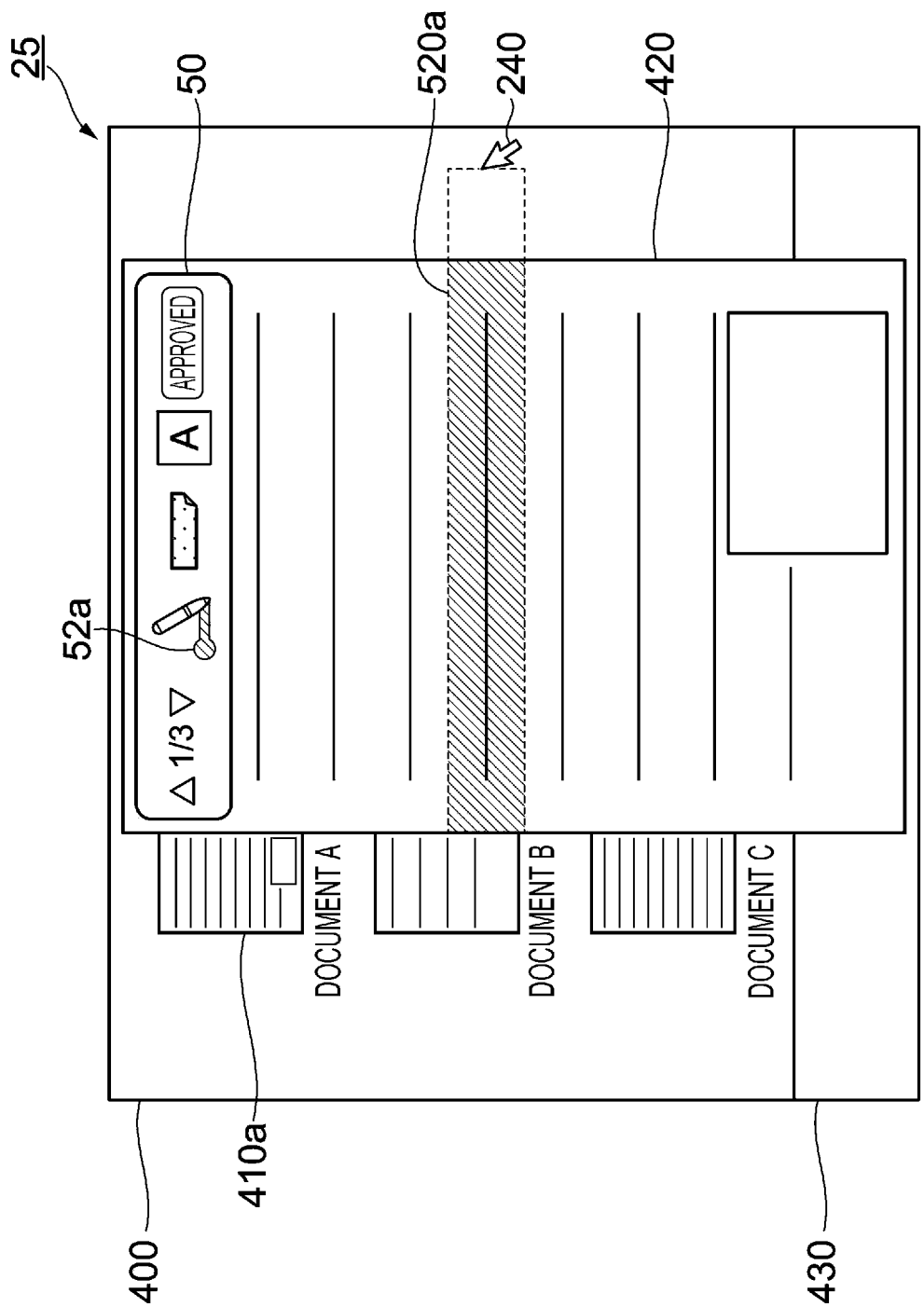
FIG. 11 is a diagram illustrating a display example of the operation screen when determining a position to add a marker image.

FIG. 11 is a diagram illustrating a display example of the operation screen 400 when determining a position to add the marker image 520a.

As illustrated in FIG. 11, in the case where the user wants to add the marker image 520a from the left edge to the right edge of the document image 420, there is a possibility that a click operation is performed at a position outside the display area of the document image 420. As described above, it may be configured that, in the case where an instruction is given to add an annotation that may be outside the document image 420, as exceptional processing, the document image 420 is not hidden even if a click operation is performed outside the display area of the document image 420. In this case, for example, the document image 420 may be hidden when a click operation is performed again after the annotation image 520 is added.

Instruction to Add Annotation

In addition, the method by which the user gives an instruction to add an annotation is not restricted. For example, it may be configured to give an instruction to add an annotation by performing a predetermined key operation or an operation on an instruction image included in the tool bar 430. However, as in the present exemplary embodiment, by configuring that an instruction to add an annotation is given by a click operation on one of the annotation icons 52 displayed within the display area of the document image 420, the document image 420 is suppressed from being unintentionally hidden when an instruction is given, as compared with the case where an instruction is given by a key operation. In addition, as in the present exemplary embodiment, by configuring that an instruction to add an annotation is accepted within the display area of the document image 420, an instruction to add an annotation may be given even after the specified coordinates are moved into the display area of the document image 420.

In addition, it may also be configured to accept changes in the position to add the annotation image 520 by specifying the annotation image 520 that has already been added to the document image 420. For example, the mode may shift to the annotation adding mode in response to a click operation on the stamp image 520*d* illustrated in FIG. 4, and, after that, a process of moving the stamp image 520*d* to a position determined by a click operation and re-adding the stamp image 520*d* may be performed. In this case, the stamp image 520*d* is an example of an instruction image for giving an instruction to add an annotation.

Displaying List of Documents

Although an example in which a list of documents managed by the document management service is displayed using the document icons 410 has been illustrated in FIGS. 4, 10A, and 10B, a list of documents may be displayed using text or the like.

Figure 12:
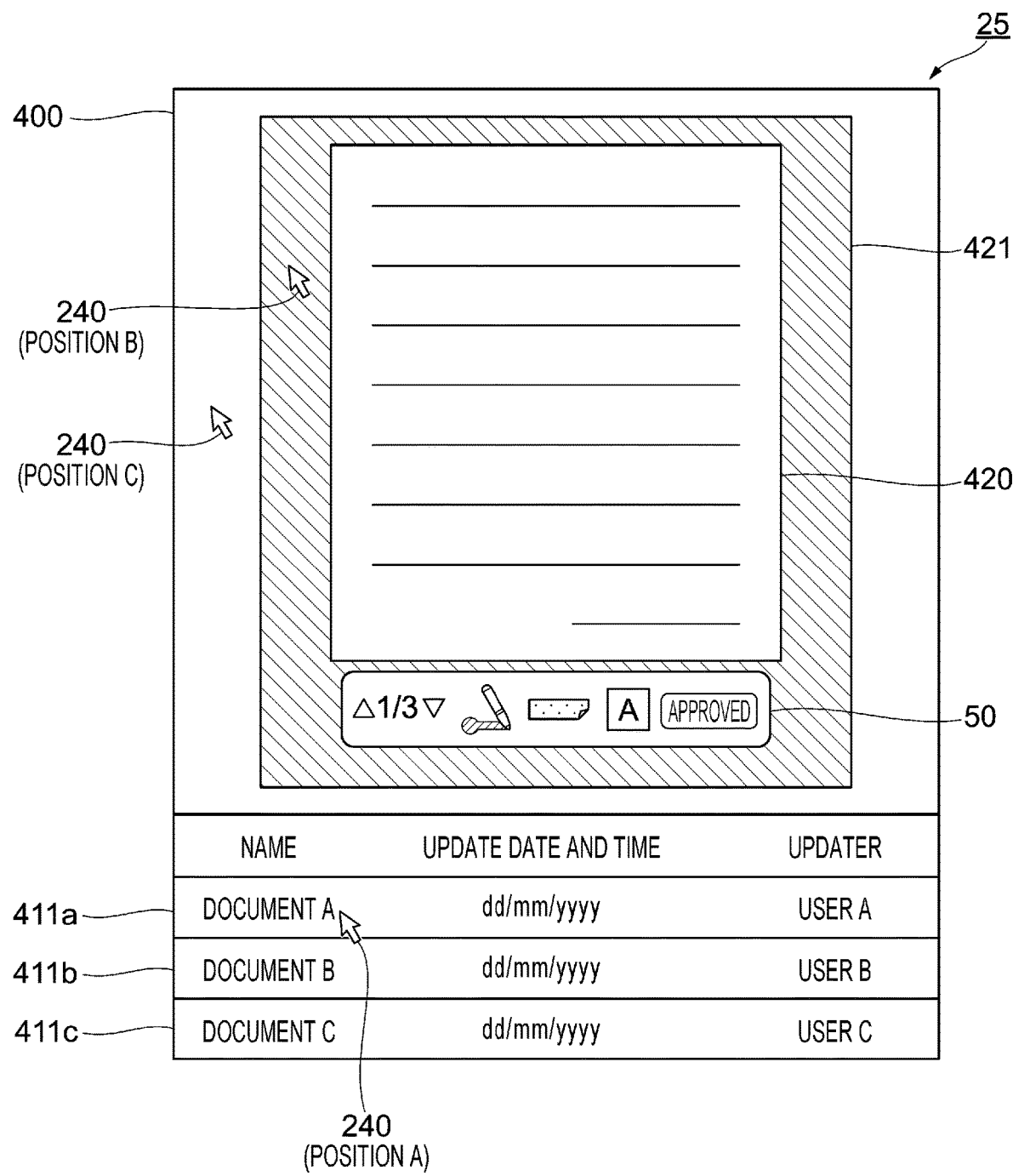
FIG. 12 illustrates an example of the operation screen in the case of displaying a list of documents using text.

FIG. 12 illustrates an example of the operation screen 400 in the case where a list of documents is displayed using text. In this example, document text 411*a*, 411*b*, and 411*c* corresponding to the documents A, B, and C, respectively, is displayed. In this case, as in the cursor 240 (position A), by performing a mouse-over operation on the document text 411*a*, an instruction may be given to display the document image 420 corresponding to the document A.

Predetermined Area

Although determination of whether to display or hide the document image 420 is performed using the display area of the document image 420 in the present exemplary embodiment, another area may serve as a predetermined area used for the determination. For example, in FIG. 12, a background image 421 is displayed so as to include the display area of the document image 420; the display area of the background image 421 may be used for the determination. In this aspect, if the mode is not the annotation adding mode, as in the cursor 240 (position B), the document image 420 is not hidden in the case where the specified coordinates are outside the display area of the document image 420 and are within the display area of the background image 421. In contrast, as in the cursor 240 (position C), the document image 420 is hidden in the case where the specified coordinates are outside the display area of the background image 421. As described above, a predetermined area used for determination of whether to display or hide the document image 420 is not particularly restricted as long as the predetermined area is an area that includes the display area of the document image 420.

In the case where the display area of the background image 421 serves as a predetermined area in the example illustrated in FIG. 12, as illustrated in the diagram, the menu image 50 may be displayed outside the display area of the document image 420 and within the display area of the background image 421. With such a configuration, deterioration of the user's ability to visually recognize the document image 420 may be suppressed, as compared with the case where the menu image 50 is displayed within the display area of the document image 420.

Processes by Single Apparatus

Although the configuration where each client apparatus 20 adds an annotation to the document image 420 and the server apparatus 10 adds an annotation to a corresponding document has been described in the above-described exemplary embodiment, these processes may be performed by a single apparatus. For example, these processes may be performed by each client apparatus 20 alone by equipping each client apparatus 20 with the function of generating the document image 420 corresponding to the document A stored in the secondary memory 22 and the function of adding an annotation to the document A.

User Operations

Various user operations described above, such as a click operation for specifying an instruction image, a click operation of determining a position, and movement of the specified coordinates, may be replaced by other operations as long as there are no contradictions. In addition, in the case where the input unit 24 includes a plurality of devices, operations of the devices may be used in combination. However, as in the present exemplary embodiment described above, user operability is improved by configuring a single device, such as a mouse, to perform various user operations, as compared with the case of using operations on multiple devices in combination.

Process Involving Determination of Position

In the present exemplary embodiment, the addition of an annotation to the document image 420 has been described as an example of a process involving determination of a position. However, the type of process involving determination of a position is not restricted, and, for example, the process may be a capture process of obtaining, as an image, the display contents in an area determined in accordance with a position determined by the user. In addition, for example, the process may be a process of obtaining text information displayed at a position or in an area determined by the user. Even in the case where an instruction to perform such a process different from the addition of an annotation is given, the process shifts to a standby state waiting for the determination of a position, as in the annotation adding mode.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
on an operation screen, display a document image corresponding to contents of a document in response to an operation, on the operation screen by a user, of giving an instruction to display the document image;
while not in a standby state, hide the document image in a case where an operation, by the user, of removing a cursor from a predetermined area of the operation screen in which the document image is displayed is performed;

in a case where an instruction to perform a process involving determination of a position on the operation screen is given by the user for the document image, shift to the standby state waiting for determination of the position, wherein the process is one of:

a process of overlaying other image or text on the document image, a process of capturing at least a part region of the document image, or a process of obtaining text information contained in the document image;

and not hide the document image in the standby state even if an operation, by the user, of removing the cursor from the predetermined area is performed.

2. The information processing apparatus according to claim 1, wherein the process involving determination of the position is a process of adding, in a case where the position is determined, an annotation using an image or text at the position.

3. The information processing apparatus according to claim 2, wherein the processor is configured to similarly add the annotation that has been added to the document image at a corresponding position of the document.

4. The information processing apparatus according to claim 1, wherein the processor is configured to cancel the standby state in a case where a cancelation condition is satisfied.

5. The information processing apparatus according to claim 2, wherein the processor is configured to cancel the standby state in a case where a cancelation condition is satisfied.

6. The information processing apparatus according to claim 3, wherein the processor is configured to cancel the standby state in a case where a cancelation condition is satisfied.

7. The information processing apparatus according to claim 4, wherein:
the cancelation condition is that an operation of determining the position is performed, and
in a case where the cancelation condition is satisfied, the processor is configured to perform the process at the position, and cancels the standby state.

8. The information processing apparatus according to claim 5, wherein:
the cancelation condition is that an operation of determining the position is performed, and
in a case where the cancelation condition is satisfied, the processor is configured to perform the process at the position, and cancels the standby state.

9. The information processing apparatus according to claim 6, wherein:
the cancelation condition is that an operation of determining the position is performed, and
in a case where the cancelation condition is satisfied, the processor is configured to perform the process at the position, and cancels the standby state.

10. The information processing apparatus according to claim 7, wherein, in a case where a predetermined operation is performed by the user, the processor is configured not to cancel the standby state even if the position is determined.

11. The information processing apparatus according to claim 8, wherein, in a case where a predetermined operation is performed by the user, the processor is configured not to cancel the standby state even if the position is determined.

12. The information processing apparatus according to claim 9, wherein, in a case where a predetermined operation is performed by the user, the processor is configured not to cancel the standby state even if the position is determined.

13. The information processing apparatus according to claim 1, wherein the processor is configured to hide the document image in a case where an operation of determining the position is performed outside the predetermined area in the standby state.

14. The information processing apparatus according to claim 2, wherein the processor is configured to hide the document image in a case where an operation of determining the position is performed outside the predetermined area in the standby state.

15. The information processing apparatus according to claim 3, wherein the processor is configured to hide the document image in a case where an operation of determining the position is performed outside the predetermined area in the standby state.

16. The information processing apparatus according to claim 4, wherein the processor is configured to hide the document image in a case where an operation of determining the position is performed outside the predetermined area in the standby state.

17. The information processing apparatus according to claim 1, wherein the processor is configured to accept the instruction to perform the process involving determination of the position on the operation screen in a state where the cursor is within the predetermined area.

18. The information processing apparatus according to claim 17, wherein:
the processor is configured to:
display, in the predetermined area, an instruction image for giving the instruction to perform the process involving determination of the position on the operation screen;
and shift to the standby state in a case where the instruction image is specified by an operation of the user.

19. A non-transitory computer readable medium storing a program causing a computer to execute a process, the process comprising:
on an operation screen, displaying a document image corresponding to contents of a document in response to an operation, on the operation screen by a user, of giving an instruction to display the document image;
while not in a standby state, hiding the document image in a case where an operation, by the user, of removing a cursor from a predetermined area of the operation screen in which the document image is displayed is performed;
in a case where an instruction to perform a process involving determination of a position on the operation screen is given by the user for the document image, shifting to the standby state waiting for determination of the position, wherein the process is one of:
a process of overlaying other image or text on the document image, a process of capturing at least a part region of the document image, or a process of obtaining text information contained in the document image;
and not hiding the document image in the standby state even if an operation, by the user, of removing the cursor from the predetermined area is performed.

20. An information processing method comprising:
receiving, on an operation screen, a display operation for displaying a document image corresponding to contents of a document;
displaying, on the operation screen, the document image in response to the display operation, on the operation screen by a user;
while not in a standby state, receiving, on the operation screen, a first cursor operation, by the user, of removing a cursor from a predetermined area of the operation screen in which the document image is displayed;

hiding, on the operation screen, the document image responsive to the first cursor operation;

receiving, on the operation screen, an instruction, by the user, to perform a process involving determination of a position on the operation screen;

responsive to receiving the position determination instruction, shifting to the standby state waiting for determination of the position, wherein the position determination process is one of:

a process of overlaying other image or text on the document image, a process of capturing at least a part region of the document image, or a process of obtaining text information contained in the document image;

receiving, during the standby state, a second cursor operation, by the user, that removes the cursor from the predetermined area;

and not hiding the document image in response to the second cursor operation.

\* \* \* \* \*